Inventor
VITTORIO ZONA

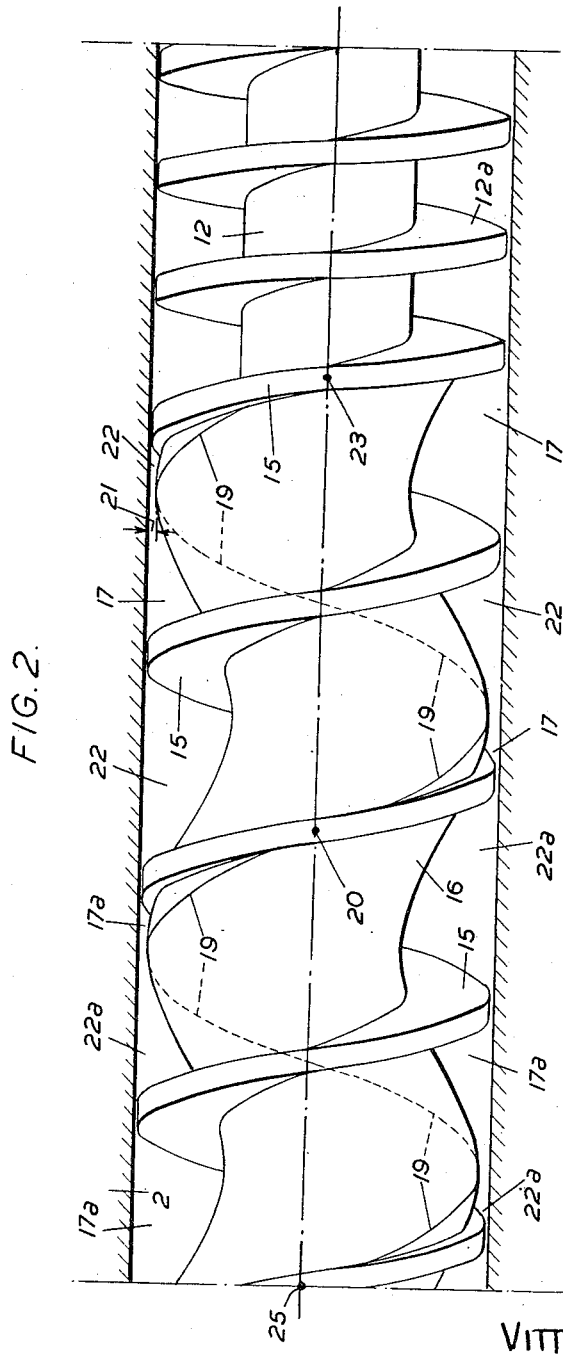

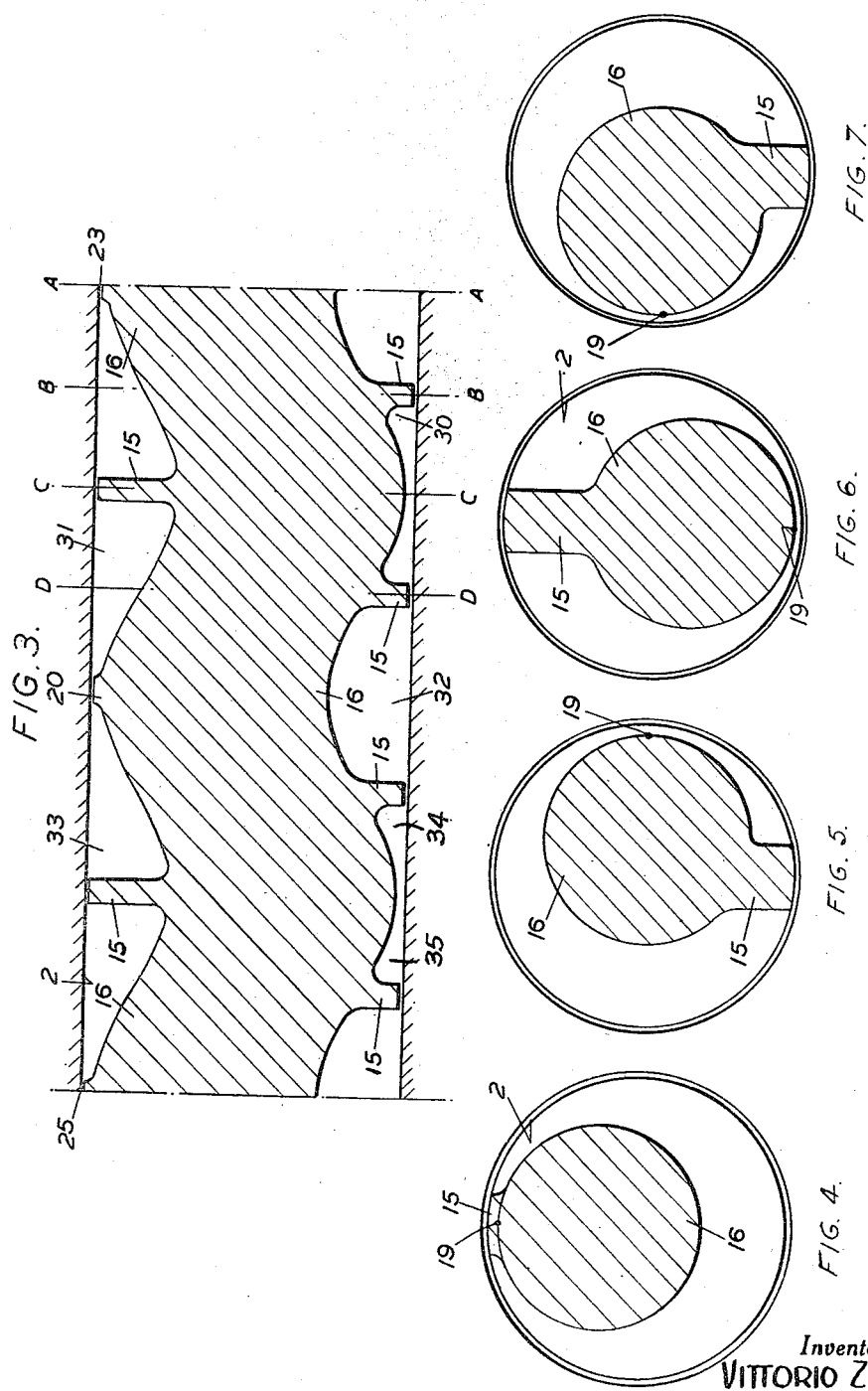

Oct. 9, 1956 V. ZONA 2,765,490
MACHINES FOR WORKING (INCLUDING MIXING, PLASTIFYING AND
PRE-HEATING) RUBBER AND LIKE PLASTICS AND
COMPOSITIONS HAVING A BASE THEREOF
Filed Sept. 5, 1951 6 Sheets-Sheet 4
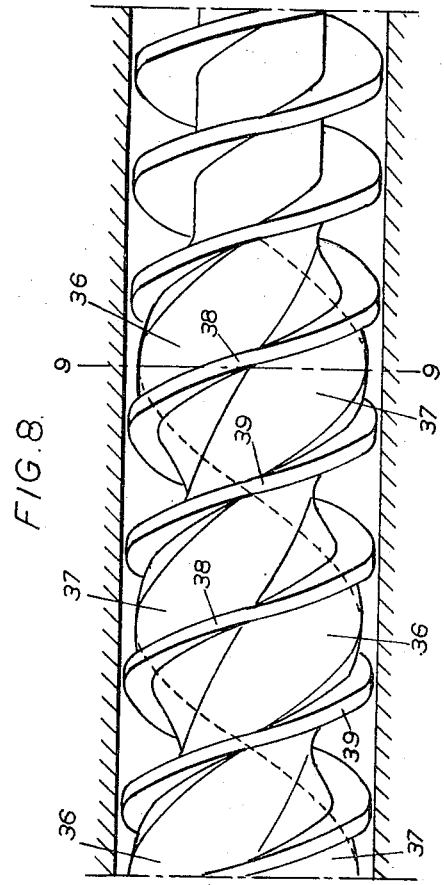
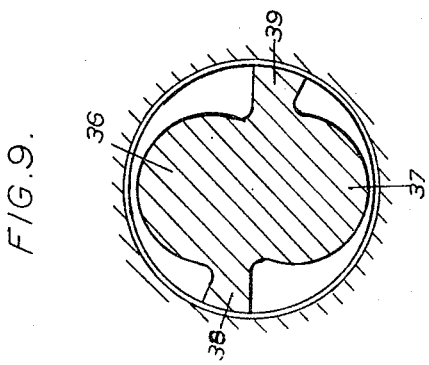
Inventor
VITTORIO ZONA
By
Toulmin & Toulmin
Attorney

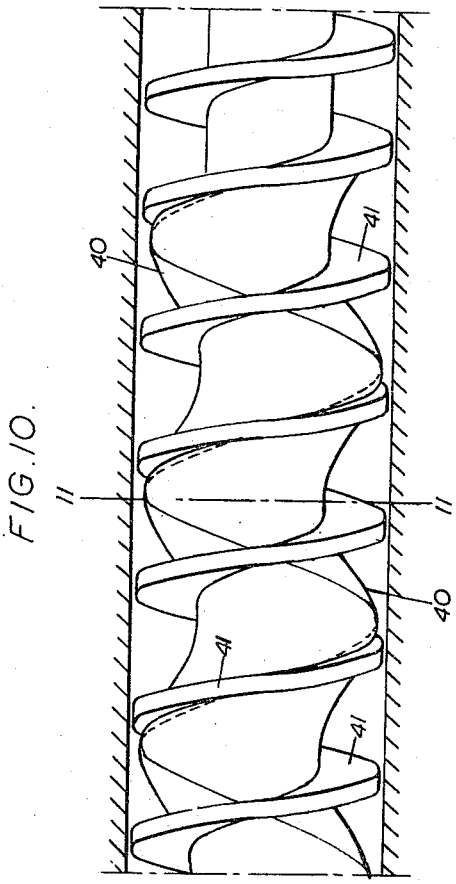
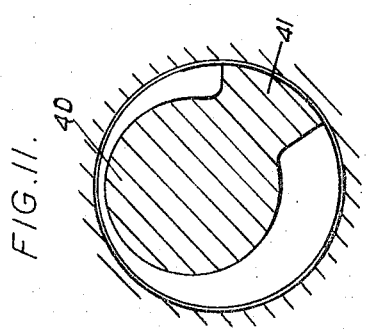

Oct. 9, 1956 V. ZONA 2,765,490
MACHINES FOR WORKING (INCLUDING MIXING, PLASTIFYING AND
PRE-HEATING) RUBBER AND LIKE PLASTICS AND
COMPOSITIONS HAVING A BASE THEREOF
Filed Sept. 5, 1951 6 Sheets-Sheet 6

INVENTOR
VITTORIO ZONA

BY

ATTORNEYS

United States Patent Office 2,765,490
Patented Oct. 9, 1956

2,765,490

MACHINES FOR WORKING (INCLUDING MIXING, PLASTIFYING AND PRE-HEATING) RUBBER AND LIKE PLASTICS AND COMPOSITIONS HAVING A BASE THEREOF

Vittorio Zona, Milan, Italy, assignor to Pirelli Societa per Azioni, Milan, Italy, a limited liability company of Italy Application September 5, 1951, Serial No. 245,182

Claims priority, application Italy January 12, 1951

10 Claims. (Cl. 18—12)

This invention relates to machines for working (including mixing, plastifying and pre-heating) rubber and like plastics and compositions having a base thereof, e. g. and rubber compositions suitable for use in the manufacture of rubber goods.

In the specification of United States Patent No. 2,485,854 a plastic working machine is described, designed for continuous operation and comprising a tubular chamber (hereinafter called the "rotor chamber") having an inlet for the material to be worked in the machine at one end of the chamber and an outlet for the worked material at the other end of the chamber, and a rotor continuously revoluble about a fixed axis coincident with the axis of the rotor chamber and virtually (i. e. not necessarily structurally, but only as regards peripheral shape) divided into three sections, namely an end section extending along an initial zone (hereinafter called the "feeding" zone) of the chamber at the end thereof at which the inlet aforesaid is situated, an end section extending along a final zone (hereinafter called the "extrusion" zone) of the chamber at the end thereof at which the outlet aforesaid is situated, and a centre section extending along an intermediate zone (hereinafter called the "working" zone) of the chamber situated intermediately between the feeding and extrusion zones, the first mentioned end section (hereinafter called the "feeding" section) extending along the feeding zone of the chamber being in the form of a worm effective in conjunction with the internal surface of the chamber continuously to feed the material which has been introduced into the chamber by way of the inlet into the working zone of the chamber, the second mentioned end section (hereinafter called the "extruding" section) extending along the extrusion zone of the chamber being also in the form of a worm effective in conjunction with the internal surface of the chamber to extrude the worked material out of the chamber by way of the outlet aforesaid, and the centre section (hereinafter called the "working" section) extending along the working zone of the chamber being effective to exercise a kneading action on the material as it is forced along this zone of the chamber.

The present invention represents an improved construction of machine of this general description (hereinafter referred to for convenience as a "continuous-operation plastic working machine of the type described") as regards the form of the working section of the rotor, adapted to improve the working of the material in the machine, with the result that it attains to a maximum possible measure of uniformity. By "uniformity" is meant that each particle of the mass as extruded from the machine by way of the outlet aforesaid of the rotor chamber is perfectly identical as regards (1) composition, (2) degree of plastification and (3) temperature, to every other particle, either in the same section of the extruded mass or in any other section preceding or following the section considered.

Before proceeding further, to define the improved construction according to the invention, it should be remarked that although the machine forming the subject matter of the above Patent No. 2,485,854 has been described in the specification of the patent as a machine for performing a mixing operation, the same machine can be used also for either of the two following additional operations: (1) Plastification of raw material (e. g. raw rubber as received from the plantation) to impart to it the required softness to enable it to be admixed with the other ingredients of the composition to be formed; (2) Pre-heating of an already formed mix (e. g. an already formed rubber mix) prior to feeding the mix into a machine (e. g. a tubing machine or calender) for imparting a particular shape to it. As regards operation 2, it is well known that in the case of compounding rubber with various ingredients, e. g. vulcanising agents, softening agents, pigmenting agents and fillers, the resulting mixture emerges from the machine in a heated condition and upon cooling down it assumes a hardened condition, with the result that before it can be fed to a shaping machine (e. g. a tubing machine or calender) it requires to be pre-heated.

According to the invention forming the subject matter of United States patent application No. 217,374 abandoned, a continuous-operation plastic working machine of the type described (as above defined) may embody certain improvements which render it more readily adaptable to use for the performance of these additional operation 1, 2.

It is to be understood, therefore, that the improved machine according to the present invention may be designed for the performance specifically of any of the following operations or any two or more of them: (1) mixing, (2) plastifying, (3) pre-heating, in the sense in which these operations are referred to above.

According to the invention of said United States Patent No. 2,485,854 the working section of the rotor of the machine has a peculiar peripheral shape according to which it can be regarded as subdivided as to its peripheral surface, axially of the rotor, into a number of elemental sections each of which is a surface of revolution about an axis parallel to the axis of the rotor, the respective axes of the sections being located (a) on a pitch circle whose axis is coincident with the axis of the rotor and (b), considering the sections in succession, at progressively increasing angular distances from a datum line intersecting the axis of the rotor, as measured by the angle included between said datum line and a line radial to the rotor and passing through the axis of the section, and the diameter of the portions of the rotor carrying the sections of the peripheral surface thereof and the radius of the pitch circle being such that the peripheries of said portions sweep closely past the interior surface of the rotor chamber as the rotor revolves, so causing the material as it is forced along the chamber to be squeezed against and rolled around said interior surface between the same and said peripheries.

It has now been found that improved results are obtained, more particularly as regards "uniformity" of the worked material as above defined, if as compared with the construction according to the Patent No. 2,485,854 (1) the "elemental sections" which go to make up the peripheral surface of the working section of the rotor be virtually reduced, as regards length axially of the rotor, to a line of infinitely small width, with the result that the working section of the rotor assumes the form of a helix whose axis of generation is coincident with the axis of the rotor, and (2) the screw thread of the feeding section of the rotor is continued along the working section thereof to the commencement of the extruding section, the preferred construction being one in which the thread of this last mentioned section is a continuation of the first mentioned thread, with the result that the thread extends continuously from end to end of the rotor.

Otherwise expressed, the improvement according to the present invention consists in employing a rotor (i. e. in a continuous-operation plastic working machine of the type described) the shape of the working section of which is substantially that of a screw having a single-helix or plural-helix helical shank, the form of the screw being such that the shank sweeps closely past the internal surface of the rotor chamber as the rotor revolves, the thread of the screw being a continuation of the thread of the feeding section of the rotor and the arrangement preferably being one in which a continuation of this same thread forms the thread of the extrusion section of the rotor. By a "single-helix" helical shank is meant a shank having the form of a single helix or strand, and by a "plural-helix" helical shank is meant a shank whose form is that or approximately that of two or more helices or strands interwound with one another.

The pitch of the thread where it extends along the working section of the rotor may be either the same as or different from that where the thread extends along the feeding section of the rotor, and either the same as or different from that of the helix or helices of the shank portion of the working section of the rotor—according, for example, to the operational requirements of the machine, and the hand of the thread may be either the same as or the reverse of that of the said helix or helices.

The invention will now be further described with reference to the accompanying drawings, which illustrate a preferred embodiment by way of example and in which:

Figure 2 is a fragmentary view of the machine on a scale larger than that of Figure 1, showing the working section of the rotor and a portion adjacent thereto of the feeding section thereof;

Figure 3 is a fragmentary longitudinal section through the working section of the rotor on a plane perpendicular to the plane of the section of Figure 2, i. e. on a plane perpendicular to the paper and lying along the line of the centre line of the rotor as it appears in Figure 2;

Figures 4, 5, 6 and 7 are respectively cross-sections through Figure 3 on the section lines A—A, B—B, C—C, and D—D thereof;

Figures 8 and 9 illustrate a construction in which a rotor is employed whose shape as regards the working section thereof is substantially that of a screw having a double-helix helical shank, and a double thread, Figure 8 being a view similar to Figure 2 and Figure 9 a cross-section through Figure 8 on the section line 9—9 thereof;

Figure 1:
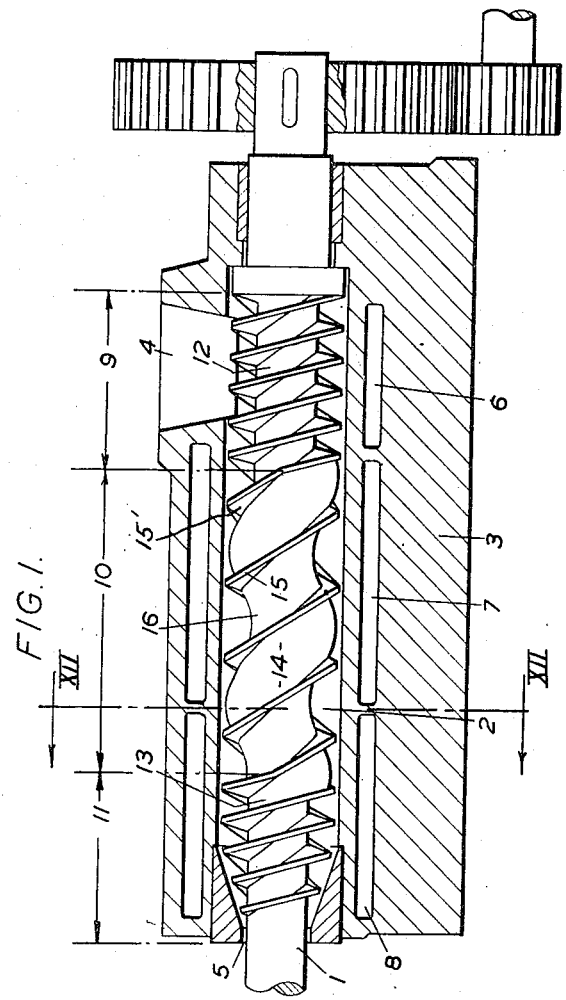
Figure 1 is a longitudinal section through a machine in accordance with the invention.
Figure 12:
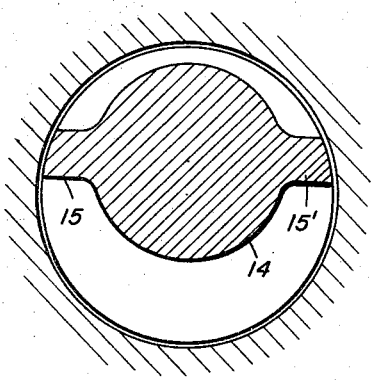
Figure 13:
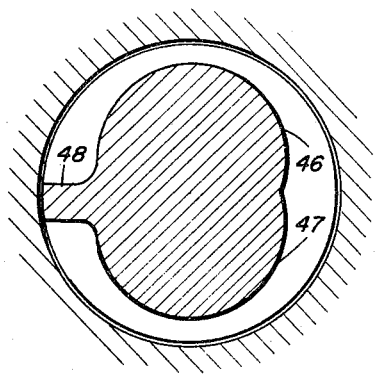
Figure 14:
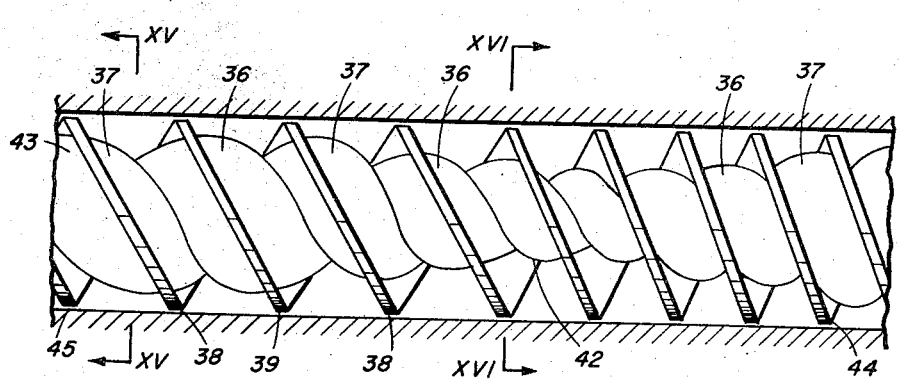
Figure 15:
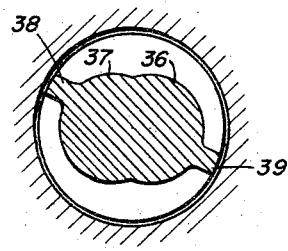

Figures 10 and 11, which are views similar respectively to Figures 8 and 9, illustrate a construction in which the shape of the rotor as regards the working section thereof is substantially that of a screw having a single-helix helical shank as in the case of the construction illustrated in Figures 1 to 7, but in which, in contrast to that construction, the hand of the helix is opposite to that of the thread portion of the "screw";

Figure 12 is a cross-section of Figure 1 along the line XII—XII;

Figure 13 illustrates another embodiment of the invention wherein the rotor chamber and the rotor therein are shown in cross-section, the rotor comprising a double helix portion and a single thread;

Figure 14 is a view similar to Figure 8 and illustrates a construction of the same embodiment having a screw with a helix-shaped portion of the rotor shaft composed of two helical strands whose amplitude varies, which define helices, the lead and amplitude of which vary, said rotor being further provided with a plurality of threads whose pitch varies;

Figure 15 is a cross-section through Figure 14 along the line XV—XV; and

Figure 16:
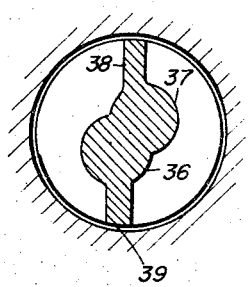

Figure 16 is another cross-section of Figure 14 along the line XVI—XVI.

Referring first to Figure 1, the machine there shown comprises a rotor 1 having the unique peripheral form characteristic of the present invention as indicated above.

This rotor extends coaxially along a generally cylindrical chamber 2 constituting the "rotor chamber" of the machine and embodied in a main body portion 3 thereof.

The body portion 3 incorporates at the right hand end of the rotor chamber a feed hopper 4 through which the material to be worked in the machine (hereinafter called "rubber," irrespective of whether it consists literally of rubber and irrespective also of whether it is a single material or a mixture of materials, e. g. a mixture of rubber and compounding ingredients as hereinbefore referred to for the formation of a rubber mix) is introduced into the machine.

At the left hand end of the rotor chamber is an outlet 5 of annular form through which the worked rubber is extruded from the machine in the manner hereinbefore described.

Also incorporated in the body portion 3 are a series of heat-exchange jackets 6, 7, 8 surrounding the wall of the rotor chamber in the manner shown in the drawing. There may also be a heat-exchange cavity in the rotor extending lengthwise thereof. A cooling medium (e. g. water) or a heating medium (e. g. steam) is circulatable in these jackets and along the cavity (if provided) in the rotor, according to the operational requirements of the machine, the machine embodying in this respect the invention aforesaid forming the subject matter of United States patent application No. 217,374.

The rotor chamber may be regarded as ideally divided into three zones, namely a "feeding" zone, a "working" zone and an "extrusion" zone as hereinbefore referred to with reference to the machine of United States Patent No. 2,485,854, the "feeding" zone being constituted by a portion 9 of the chamber adjacent the feed hopper 4, the "extrusion" zone by a portion 11 adjacent the outlet 5 and the "working" zone by an intermediate portion 10 between the two portions 9, 11.

In correspondence with the three zones of the rotor chamber the rotor may also be regarded as ideally divided into three sections, a "feeding" section extending along the zone 9 of the rotor chamber, a "working" section extending along the zone 10 thereof and an "extruding" section extending along the zone 11 of the chamber.

The "feeding" section is constituted by a worm 12. The extruding section is also constituted by a worm 13. The "working" section has the form, in accordance with the present invention, of a screw having a helical shank, said "working" section being marked 14 in Figure 1, the thread of the "screw" being marked 15 and the "helical shank" thereof 16.

The worm 12 may have one or more threads (i. e. it may be either a single-thread worm or a plural-thread worm) and the pitch of its thread or threads may be either constant or variable. The length of the worm will depend upon the operational requirements of the machine, which in turn will depend upon the characteristics of the material to be worked therein.

The same remarks apply to worm 13. Figures 1 and 12, the worm portions 12, 13, 14 bear a double thread 15, 15".

As shown in the drawings, the top-of-thread diameter of the worms 12, 13 is only very slightly less than the internal diameter of the rotor chamber, as is usual in extruders and like machines employed in the rubber industry consisting of a screw revoluble within a tubular chamber.

Referring now to section 14 of the rotor, it will be seen from Figure 1 that the thread 15 of this section is a continuation of the thread of worm 12, and similarly the thread of worm 13 is a continuation of thread 15, the pitch of thread 15 being, however, greater than (actually it is twice) that of the threads of worms 12, 13.

It will also be seen, from Figure 1 and similarly from the other figures of the drawings, that thread 15 forms with the remainder of the peripheral surface of the working-section of the rotor on the one hand and the internal surface of the working zone of the rotor chamber on the other, a continuous channel extending along the rotor helically around the axis thereof and constituting a continuation of the helical channel which is defined by the worm 12 on the one hand and the internal surface of the feeding zone of the rotor chamber on the other, the similar helical channel which is defined by the other worm 13 and the internal surface of the extrusion zone of the rotor chamber being in turn a continuation of the first mentioned channel.

The form of the "working" section of the rotor is such that the helical channel or channels along that section which the periphery of the rotor forms with the internal surface of the rotor chamber is or are of a minimum cross-sectional area which is substantially equal to that of the channel or channels along the feeding zone of the chamber which the periphery of the "feeding" section of the rotor forms with said internal surface, whereby strangulation of the plastic flow at the entrance of the "working" zone of the chamber is avoided.

Examining, with reference to Figures 2 and 3, in conjunction with Figures 4, 5, 6 and 7, the cross-sectional form of the channel (hereinafter called the "kneading" channel, since it is in this channel that the major portion of the kneading of the rubber takes place in the course of advance of the rubber through the machine) extending along the working zone of the rotor chamber, it will be seen that said cross-sectional form changes from point to point along the channel and further that the change of form is cyclical, i. e. the cycle of change is repeated.

In order to make the position more clear in this respect, the "kneading" channel will be considered as ideally divided into four parts, two on either side of the point of mid-length of the working section of the rotor. These parts, which for convenience will be called "elements" are (in the particular embodiment of the invention shown) identical to one another and each corresponds to one complete cycle of variation of the cross-sectional shape of the channel.

Thus (see Figure 2) the rubber, under thrust from the thread 12a of the worm 12, first enters an "element" 17 of the kneading channel, defined on one side by the thread 15 of the working section of the rotor and on the other side by a continuous helical ridge 19 defined (in the elevational view of the rotor) by the linear trace of a point drawn along the peripheral surface of the helical shank portion of the "screw" forming the working section of the rotor, where from point to point along the surface, longitudinally of the rotor, the surface is situated at the greatest radial distance from the axis of the rotor. Figures 4, 5, 6 and 7 show the position of this ridge around the axis of the rotor, at the four positions therealong corresponding respectively to the four section lines A—A, B—B, C—C and D—D of Figure 3.

Since the pitch of the ridge 19 is greater (as shown) than the pitch of the thread 15, the ridge gradually approaches the thread until it intersects the same at the point 20 (see Figure 2). At this point 20, element 17, the cross-section of which has gradually diminished from a maximum at the end of the element adjacent the worm 12 to a minimum at the point 20 where it vanishes, terminates.

Since the external diameter of the thread 15 is only very slightly less than the internal diameter of the rotor chamber, with the result that the thread almost skims the chamber surface, whereas the ridge 19 is, completely along the length thereof, spaced a short distance 21 from the surface of the chamber, it follows that the whole of the rubber entering the element 17 is obliged to pass through the space 21 between the ridge and the internal surface of the chamber before it can reach point 20.

The passage of the rubber through the space 21, which as will be understood, forms in effect a well defined aperture, occurs simultaneously with turning of the rotor with respect to the stationary wall of the rotor chamber. In the result the rubber, as it passes through the aperture, which will be hereinafter referred to as "aperture L" and the height dimension of which, i. e. radially of the rotor, is relatively small (see Figure 2), becomes subjected to a laminating and intense working action very similar to the action of the rolls of a mixer of the type comprising two rolls disposed with their axes parallel and rotatable at relatively different speeds, which action is repeated upon the rubber in the course of its passage from the point 20 to the point 25 whereat the rubber leaves the working zone (see Figure 2) of the rotor chamber.

It may be said therefore that in the course of passage of the rubber through the working zone of the chamber, the rubber is subjected to a "first" and "second" working phase—using the term "working phase" to connote a phase of intense working action upon the rubber as above referred to.

Having been forced over the ridge 19 (i. e. through aperture L) the rubber enters a second "element" 22 extending along the same portion of the channel as the element 17 and as in the case of that element, bounded on one side by the thread 15 and on the other by the ridge 19. The two elements combine to make up the right hand half of the channel between the point 20 and the delivery end of the worm 12.

As will be seen from Figures 2 and 3, the element 22 commences (i. e. at the right hand end of the element— point 23) with a cross-section which approximates to zero, just as element 17 terminates at the left hand end (point 20) with zero cross-section.

Its cross-section progressively enlarges from point to point along the element, however, until a point therealong corresponding to 180° of revolution of the rotor from the point 23, the cross-section of the element is as indicated at 30 in Figure 3, while at a point along the element corresponding to 360° of revolution from the point 23, the cross-section of the element is as indicated at 31 in Figure 3. At this last mentioned point the whole of the rubber has become discharged over the ridge 19 from the element 17 into the element 22.

At a point along the channel corresponding to 540° of revolution of the rotor from the point 23, the shape and size of the channel is as indicated at 32 in Figure 3, its total cross-section at this point being made up of the left hand end of element 22 and the right hand end of another element 22a similar to the element 22 but constituting the obverse thereof in that it diminishes in cross-section towards the point 25 at the left hand end of the channel.

At a point along the channel corresponding to 720° of revolution of the rotor from the point 23, the element 22a has the shape and size indicated at 33 in Figure 3, which as will be seen is the exact obverse of the shape and size of the element 22 at 31. From this point on the rubber begins to leave the element 22a, passing over the ridge 19, into another element 17a similar to the element 17 but constituting the obverse thereof just as element 22a constitutes the obverse of element 22. The section of this element 17a at a point along the channel corresponding to 900° of revolution of the rotor from point 20, is shown at 34 in Figure 3.

At this point along the channel, corresponding to 900° of revolution of the rotor from the point 23, the shape and size of the element 22a is as indicated at 35 in Figure 3, which again is the exact obverse of the shape and size of the element 22 at 30.

At a point along the channel corresponding to 1080° of revolution of the rotor from the point 23, viz. at the point 25, element 22a terminates and the rubber enters the extrusion zone of the rotor chamber.

The resulting continuous variation of the cross-sectional shape and area of the channel along which the rubber is thus forced to proceed as it makes its way along the working zone of the rotor chamber, causes the rubber mass continually to change its shape and direction of movement—with the result that an exceedingly efficient kneading action upon the rubber, ensuring the attainment of a high measure of "uniformity" thereof, as extruded from the machine, is obtained.

As already indicated, the cross-sectional area of the portion of the channel constituted by the elements 22 and 22a first increases along an initial portion of the channel adjacent point 20, where the rubber becomes forced over the ridge 19 into the adjacent element 17, and then decreases, along a final portion of the channel 15 adjacent point 25, where the rubber becomes forced over the ridge 19 a second time, into element 17a. Along a medial part of the channel, to either side of point 20, the cross-section of the channel changes from the shape and size in which it appears at 31 (180° of revolution of the rotor to the right of the point 20), first to the shape and size in which it appears at 32 and finally to the shape and size in which it appears at 33 (180° to the left of point 20).

The variation of the cross-sectional area of the channel is therefore proportional to the volume of rubber the channel has to accommodate within its two end portions (namely the "initial" portion and "final" portion aforesaid), with the result that the entire mass of the rubber is compelled to advance along the portions of the rotor where it is subjected to a lamination and intense working action, at a uniform speed. Intermediate said end portions, where the rubber is not subjected to such lamination and intense working action, the rubber is nevertheless subjected to a considerable measure of kneading action, due to the change of cross-section of the channel along which it is being forced and to the fact that its rate of advance first decreases, as it passes from section 31 to section 32 (see Figure 3), where the section of the channel has a maximum area, and then increases, as it passes from section 32 to section 33.

As appears from the drawings (see particularly Figure 2) the helical shank portion 16 of the working section of the rotor comprises two convolutions (i. e. of the helix), while the thread portion 15 comprises four convolutions. It follows, therefore, that the rubber passes between the ridge 19 and the internal surface of the rotor chamber twice in the course of its advance through the working zone of the chamber, with the result that, as already remarked, it becomes subjected to a laminating and intense working action twice in making its way along this zone. Had the thread portion 15 comprised six convolutions, the rubber would correspondingly have been subjected three times to the laminating and intense working action referred to.

It follows, therefore, that by increasing the number of convolutions of the thread portion 15 of the working section of the rotor it is possible correspondingly to increase at will the number of "working" phases which are performed upon the rubber as it is forced through the machine.

If the number of convolutions of the thread 15 is kept constant and the pitch of the helical shank portion 16 (in other words, the pitch of the sinusoidal line of ridge 19) is varied, the number of apertures L through which the rubber has to pass in succession in making its way through the working zone of the rotor chamber (and therefore the number of "working phases" which are performed upon the rubber) will remain unaltered, but the cross-sectional area of the apertures will be varied. Thus the apertures have, considered as developed, an approximately rectangular form, the height of the rectangle corresponding to the radial distance between the ridge 19 and the internal surface of the rotor chamber, and the length corresponding to the distance along the line of the ridge between two points of intersection thereof with the line of the thread 15, i. e. between the points 25 and 20 or the points 20 and 23, which in the embodiment of the invention shown are equal, the respective pitches of the thread 15 and the line of the ridge being uniform from end to end of the working section of the rotor. Consequently a reduction of the pitch of the helical shank portion 16 will result in a corresponding increase in the length of the aperture L and therefore in the cross-sectional area thereof, and vice versa.

The cross-sectional area of the apertures L should be equal to that of the channel leading the rubber to the working zone of the rotor chamber (i. e. the channel formed by the peripheral surface of the worm 12 in conjunction with the internal surface of the rotor chamber along the feeding zone 9 thereof) in order to avoid any strangulation of the rubber flow along said feeding zone of the chamber, which would tend to produce regurgitation and to reduce the "uniformity" of the material as extruded from the machine. It should similarly be equal to the cross-sectional area of the channels extending along the working section of the rotor, i. e. between the apertures L at the two ends of the channel.

It follows therefore that if the length of the apertures L is varied it is also necessary, for a given cross-sectional area of the channel leading the rubber to the working zone of the rotor chamber, to vary the height of the apertures to a corresponding degree. This can be accomplished either by varying the cross-sectional diameter of the shank portion 16 of the working section of the rotor or by varying the amplitude of the helical line along which the axis of said shank portion lies around the axis of the rotor, or by varying both of these dimensions, it being borne in mind that both of these variations incidentally influence also the shape of the mouth (entrance portion) of the apertures and in addition the shape and cross-sectional area of the "elements" of the channels along which the rubber is forced as it makes its way through the working zone of the rotor chamber.

In the embodiment of the invention illustrated in Figures 2 to 7 the worms 12 and 13 are single-thread worms and the "screw" as hereinbefore referred to forming the working section of the rotor is similarly formed with a single thread. Both the worms and the "screw" may, however, have more than one thread, if desired. Also the shank portion of the "screw" may be of the form of two or more helices interwound with one another. Again the hand of the thread or threads of the "screw" may be either the same as or opposite to that of the helix or helices of the shank portion. Certain of these possible variations are illustrated in Figures 8 to 11.

Thus, referring to Figures 8 and 9, the arrangement shown in these figures is one in which the shank portion of the "screw" comprises two helices 36, 37, the thread portion comprises two continuous ridges of threads 38, 39 and the hand of the threads 38, 39 is the same as that of the helices 36, 37, the lead of the helices being twice the amount of the pitch of the threads.

The arrangement according to Figures 10 and 11 is one in which the shank portion of the "screw" comprises a single helix 40, the thread portion comprises a single thread 41 and the hand of the thread 41 is opposite that of the helix 40, while the lead of the helix is again equal to twice the pitch of the thread.

In Figure 13 the helix-shaped portion of the shaft body of the rotor consists of two helical strands 46, 47. The rotor is provided with a single thread 48.

The arrangement according to Figure 14 is the same as that in Figures 8 and 9, namely, one in which the shank portion of the "screw" comprises a double helix 36, 37, the thread portion comprises two continuous ridges of threads 38, 39, and the hand of the threads 38, 39, is the same as that of the helices 36, 37, the lead of the helices being twice as large as the pitch of the threads. Furthermore, in this figure, the lead of the helices and the pitch of the threads vary from a minimum for the lead of the helices at 42 to a maximum at 43 and from a minimum for the pitch of the threads at 44 to a maximum at 45. Finally, the amplitude of the helices 38, 39 varies from a minimum at 42 to a maximum at 43.

It will be appreciated that the action of the "working section" of the rotor upon the rubber may be varied in any of the following ways:

(1) By varying the pitch of the thread portion or portions of the "screw." Thus, assuming a given lead of the helix or helices of the shank portion, variation of the pitch of the thread portion or portions results in a corresponding variation of the number of apertures L through which the rubber has to pass and also, assuming a given cross-sectional diameter of the shank portion and a given amplitude of the helical line or lines which represent the longitudinal central axis or axes of the helix or helices of the shank portion lies around the axis of the rotor, a corresponding variation of the cross-sectional shape of the channels along which the rubber is forced as it makes its way through the chamber.

(2) By varying the lead of the helix or helices of the shank portion of the "screw." Thus, assuming a given pitch of the thread portion or portions and a given cross-sectional radius of the helix or helices of the shank portion, a corresponding variation of the shape and cross-sectional area of the channels along which the rubber is forced and also of the length of the apertures L is occasioned by varying the lead of the helix or helices of the shank portion of the screw.

(3) By varying the cross-sectional radius of the helix or helices of the shank portion of the screw and/or the amplitude of the helical line or lines aforesaid which represent the longitudinal central axis or axes of said helix or helices. Thus, variation of either of these dimensions occasions a corresponding variation of the height and mouth-shape of the apertures L and also, assuming a given pitch of the thread portion or portions of the screw, of the shape and cross sectional area of the "elements" of the channels.

It is possible, therefore, by suitably determining these variants correspondingly to determine the operational characteristics of the machine, and therefore to design a machine for any particular operational use—whether this be mixing, plastifying or pre-heating, or indeed any other operation in the field of working of rubber and like plastics.

Finally, it may be pointed out that the characteristics of the working zone of the machine show a variation according to the form of the working section of the rotor in the following manner:

(A) In the case of a rotor of which (as in the rotor of Figures 2 to 7) the "screw" forming the working section is a single-thread, right-handed screw whose shank portion has the form of a single, right-handed helix, each aperture L whereat the throttling of the rubber flow and therefore the intense working of the rubber occur, extends for 360° around the axis of the rotor, while each channel extends, from the aperture L at one end thereof to the aperture L at the other end, for 720° around said axis.

(B) In the case of a rotor of which (as in the rotor of Figures 8 and 9) the "screw" is a double-thread, right-handed screw whose shank portion has the form of a double, right-handed helix, each aperture L extends for 180° around the axis of the rotor and each channel extends for 360° therearound.

(C) In the case of a rotor of which (as in the rotor of Figures 9 and 10) the "screw" is a single-thread, left-handed screw whose shank portion has the form of a single, right-handed helix, each aperture L extends for 120° around the axis of the rotor and each channel extends for 240° therearound.

It follows, therefore, that, bearing in mind that the cross-sectional area of the apertures L has to be equal to that of the channels, the processing (working) of the rubber is the most efficient and the most prolonged with a rotor according to Case A, being less efficient and shorter with a rotor according to Case B and least efficient and of least duration with a rotor according to Case C.

What I claim as my invention and desire to secure by Letters Patent of the United States is:

1. A machine for working plastics in a continuous operation comprising a rotor in the form of a worm, a tubular rotor chamber in which the rotor is rotatively mounted, said rotor chamber having an inlet for the plastic at one end and an outlet therefor at the opposite end and comprising in succession, a feeding zone, a working zone, and an extrusion zone, said rotor worm comprising a helical-shaped shank portion carrying at least one thread portion extending along it, the outer helical surface of said shank portion being adapted to define with the internal surface of the rotor chamber at least one helically extending aperture of restricted height dimension radially of the rotor, said rotor being shaped to provide a working space along which the plastic travels, said space being divided by the thread portion of the rotor into at least one helical-shaped channel whose cross-sectional area, by reason of the helical-shape of said shank portion, varies progressively from point to point along the channel, alternatively increasing to a maximum and then decreasing to a minimum.

2. A machine for working plastics in a continuous operation as set forth in claim 1, wherein the rotor worm comprises a plurality of helical-shaped thread portions 3. A machine for working plastics in a continuous operation as set forth in claim 1, wherein the shank portion of the rotor along the working zone thereof is of plural helix form with its external surface conforming substantially to that of a plurality of helices interwound with one another.

4. A machine for working plastics in a continuous operation as set forth in claim 1, wherein the thread portion on said helical-shaped shank portion is of the opposite hand to the hand of the helix defined by said helical-shaped portion.

5. A machine for working plastics in a continuous operation as set forth in claim 1, wherein the amplitude of the helix defined by said helical-shaped shank portion varies up to a maximum amplitude which is slightly smaller than the radius of said rotor chamber.

6. A machine for working plastics in a continuous operation as set forth in claim 1, wherein the lead of the helix defined by said helical-shaped shank portion varies over the length of the latter.

7. A machine for working plastics in a continuous operation as set forth in claim 1, wherein the rotor worm comprises a plurality of helical-shaped thread portions and the shank portion of the rotor along the working zone is of plural helix form with its external surface conforming substantially to that of a plurality of helices interwound together.

8. A machine for working plastics in a continuous operation as set forth in claim 1, wherein the pitch of said thread varies along said helical-shaped portion of said rotor.

9. A machine for working plastics in a continuous operation comprising a rotor in the form of a worm, a tubular rotor chamber in which the rotor is rotatively mounted, said rotor chamber having an inlet for the plastic at one end and an outlet therefor at the opposite end and comprising in succession, a feeding zone, a working zone, and an extrusion zone, said rotor worm comprising a plurality of helical-shaped thread portions and a shank portion of plural helix form having at least one thread portion extending along it, the outer helical surface of said shank portion being adapted to define with the internal surface of the rotor chamber at least one helically extending aperture of restricted height dimension radially of the rotor, said rotor being shaped to provide a working space along which the plastic travels, said space being divided by the thread portions of the rotor into a plurality of helical-shaped channels whose cross-sectional areas, by reason of the helical shape of said shank portion, vary progressively from point to point along the channel, alternatively increasing to a maximum and then decreasing to a minimum.

10. A machine for working plastics in a continuous operation as set forth in claim 9, wherein the thread portion on said helical-shaped shank portion is of the same hand to the hand of the helix defined by said helical-shaped portion.

References Cited in the file of this patent

UNITED STATES PATENTS

| | | |
|---|---|---|
| 1,904,884 | Royle | Apr. 18, 1933 |
| 2,319,859 | Hale | May 25, 1943 |
| 2,407,503 | Magerkurth et al. | Sept. 10, 1946 |
| 2,511,203 | Gliss | June 13, 1950 |
| 2,620,752 | Braibanti et al. | Dec. 9, 1952 |
| 2,639,464 | Magerkurth | May 26, 1953 |

FOREIGN PATENTS

| | | |
|---|---|---|
| 649,187 | Germany | Aug. 18, 1937 |